US012809845B2

(12) United States Patent
Subramaniam et al.

(10) Patent No.: US 12,809,845 B2
(45) Date of Patent: Nov. 24, 2026

(54) GENERATION AND APPLICATION OF PERSONNEL WORK GRAPH

(71) Applicant: DevFactory Innovations FZ-LLC, Dubai (AE)

(72) Inventors: Rahul Subramaniam, Chennai (IN); Nitin Labhishetty, Mumbai (IN); Ashish Chauhan, Ghaziabad (IN); Darshan Agarwal, Hyderabad (IN); Vadiraja Kanaradi, Bangalore (IN)

(73) Assignee: DevFactory Innovations FZ-LLC, Dubai Media City (AE)

( * ) Notice: Subject to any disclaimer, the term of this patent is extended or adjusted under 35 U.S.C. 154(b) by 0 days.

(21) Appl. No.: 17/192,717

(22) Filed: Mar. 4, 2021

(65) Prior Publication Data

US 2021/0279220 A1 Sep. 9, 2021

Related U.S. Application Data

(60) Provisional application No. 62/985,058, filed on Mar. 4, 2020.

(51) Int. Cl.

| | |
|---|---|
| ***G06F 16/245*** | (2019.01) |
| ***G06F 16/22*** | (2019.01) |
| ***G06F 16/25*** | (2019.01) |
| ***G06F 16/28*** | (2019.01) |

(Continued)

(52) U.S. Cl.

CPC ........ *G06F 16/2264* (2019.01); *G06F 16/245* (2019.01); *G06F 16/25* (2019.01); *G06F 16/28* (2019.01); *G06F 16/901* (2019.01)

(58) Field of Classification Search

None

See application file for complete search history.

(56) References Cited

U.S. PATENT DOCUMENTS

| | | | | |
|---|---|---|---|---|
| 7,331,058 | B1 * | 2/2008 | Gladney | G06F 21/6218 726/2 |
| 8,812,586 | B1 * | 8/2014 | Kulkarni | H04L 43/08 709/203 |
| 9,940,394 | B1 | 4/2018 | Grant et al. | |

(Continued)

OTHER PUBLICATIONS

Jonathan Perry; Fastpass: A Centralized "Zero-Queue" Datacenter Network; ACM; 2014; pp. 307-318.*

(Continued)

*Primary Examiner* — Ann J Lo
*Assistant Examiner* — Jermaine A Mincey
(74) *Attorney, Agent, or Firm* — Kent B. Chambers; Terrile, Cannatti & Chambers, LLP

(57) ABSTRACT

A system, method, and computer-readable medium are disclosed for improved generation and use of personnel work graphs that show relations between entities, such as people, communication between people, work artifacts with people, and work artifacts with other work artifacts. Data from different importers are identified, where new data sources can be added at a later time and data is seamlessly added to the graphical representation of the work graphs. Data includes personnel and work artifacts. Since object related data, such as work, roles and responsibilities continuously change, in at least one embodiment, a continuous process of importing and synchronization is performed for the data, and a graphical representation of the data is created.

23 Claims, 5 Drawing Sheets

200

(51) Int. Cl.
*G06F 16/901* (2019.01)
*G06Q 10/10* (2023.01)

(56) References Cited

U.S. PATENT DOCUMENTS

| | | | | |
|---|---|---|---|---|
| 10,229,205 | B1 | 3/2019 | Grant et al. | |
| 11,575,693 | B1 | 2/2023 | Muddo et al. | |
| 2011/0131475 | A1* | 6/2011 | Thoumy | H03M 13/2936<br>714/780 |
| 2013/0325343 | A1* | 12/2013 | Blumenberg | G06F 3/04883<br>701/533 |
| 2017/0329868 | A1 | 11/2017 | Lindsley | |
| 2020/0311680 | A1* | 10/2020 | Wahl | H04L 65/1096 |
| 2021/0117868 | A1* | 4/2021 | Sriharsha | G06F 16/24568 |
| 2021/0133203 | A1* | 5/2021 | Rajavel | G06F 16/245 |
| 2021/0200782 | A1* | 7/2021 | Dodson | G06F 16/245 |
| 2021/0224235 | A1* | 7/2021 | Arnaboldi | G06F 16/27 |

OTHER PUBLICATIONS

European Patent Office, International Search Report dated May 12, 2022, International Application No. PCT/US2022/018971, EPO, Rijswijk, The Netherlands.
International Search Authority, Written Opinion of the International Searching Authority dated Aug. 29, 2023, International Application No. PCT/US2022/018971, Geneva Switzerland.
Hsinchun Chen et al., Business Intelligence and Analytics: From Big Data to Big Impact, MIS Quarterly, vol. 36, No. 4, pp. 1165-1188, Dec. 2012.

* cited by examiner

GENERATION AND APPLICATION OF PERSONNEL WORK GRAPH

CROSS-REFERENCE TO RELATED APPLICATION

This application claims the benefit under 35 U.S.C. § 119(e) and 37 C.F.R. § 1.78 of U.S. Provisional Application No. 62/985,058, filed Mar. 4, 2020, which is incorporated by reference in its entirety.

BACKGROUND

Field

The described invention relates in general to data processing systems, methods to generate and apply personnel work graphs that show relations between entities, including people, communication information between people, work artifacts with people, and work artifacts with other work artifacts.

Description of the Related Art

As the value and use of information continues to increase, individuals and businesses seek additional ways to process and store information. Data processing systems represent one option available to users to process and store state. A data processing system generally processes, compiles, stores, and/or communicates information or data for business, personal, or other purposes thereby allowing users to take advantage of the value of the information. Because technology and data processing needs and requirements vary between different users or applications, data processing systems also vary regarding what information is processed, how the information is processed, how much information is processed, stored, or communicated, and how quickly and efficiently the information is processed, stored, or communicated. The variations in data processing systems allow for data processing systems to be general or configured for a specific user or specific use such as enterprise data processing, data storage, etc. In addition, data processing systems include a variety of hardware and software components that are configured to process, store, and communicate information and include one or more computer systems, data storage systems, and networking systems.

Organizations typically implement a hierarchical organization structure that depicts a top down reporting of people in the organization. Such organization structures illustrate a formal reporting of personnel; however, formal organizational structures may not show how people/personnel actually or operationally interact and work with one another. For example, a person at the top of an organization structure may work closely and/or communicate frequently with people/personnel at levels or nodes of the organizational structure that are far removed from that person's level or node. Furthermore, such formal organization structures may not provide information as to abilities, experiences, and other detailed information as to particular personnel in an organization.

SUMMARY

A computer-implementable method for generating and using a work graph that includes executing instructions by a processor of a data processing system to cause the data processing system to perform:

identifying one or more data sources that provide particular data types and insights to entities;

providing one or more importers, wherein a particular importer supports a particular data source;

importing through the importers, data from the one or more data sources;

matching entities from the one or data sources to create the work graph; and performing a query as to particular insight of an entity stored in the work graph.

A system that includes a processor and a non-transitory, computer-readable storage medium, coupled to the processor and storing executable computer program code for generating and using a work graph, wherein during operation the processor executes the instructions to:

identify one or more data sources that provide particular data types and insights to entities;

provide one or more importers, wherein a particular importer supports a particular data source;

import through the importers, data from the one or more data sources;

matching entities from the one or data sources to create the work graph; and performing a query as to particular insight of an entity stored in the work graph.

A non-transitory, computer-readable storage medium embodying computer program code, the computer program code comprising computer executable instructions configured for:

identifying one or more data sources that provide particular data types and insights to entities;

providing one or more importers, wherein a particular importer supports a particular data source;

importing through the importers, data from the one or more data sources;

matching entities from the one or data sources to create the work graph; and performing a query as to particular insight of an entity stored in the work graph.

BRIEF DESCRIPTION OF THE DRAWINGS

The described may be better understood, and its numerous objects, features and advantages made apparent to those skilled in the art by referencing the accompanying drawings. The use of the same reference number throughout the several figures designates a like or similar element.

DETAILED DESCRIPTION

Embodiments of a work graph generation and use system and method provide improved generation and use of personnel work graphs that relate objects, including people, communication information between people, and work artifacts to allow searching of relationships between objects including contact information. In at least one embodiment, an object represents an individual, a business, and other types of related or associated information information. A work graph includes data that shows diverse relationships between entities inside an organization, where entities include a person, email, documents, project, issue, etc. Entities are represented as nodes in a work graph. Interactions or attributes between entities/nodes are provided in a work graph. Examples of such interactions or attributes include which person sent email to whom, who all collaborated to create a specific document, etc. In at least one embodiment, the work graph generation and use system and method provide a technical solution that enables a data processing system to import information to identify, organize, consolidate, and depict work graph information in a manner not reasonably performed by manual human processes.

In at least one embodiment, the work graph generation and use system and method integrates data from various importers and numerous data sources. In at least one embodiment, the data sources are diverse from one another and represent and store data in diverse data structures. In at least one embodiment, the work graph generation and use system and method provides for a single graph that integrates such diverse data and data structures. In at least one embodiment, importer technology tools ("importers") provide an endpoint to onboard data for an initial data upload and another endpoint to synchronize, refresh, or otherwise update the data. In at least one embodiment, the importer continuously updates the data. The importers import data from the different sources agnostically. In other words, there is no set order of import to create or update a work graph.

Figure 1:
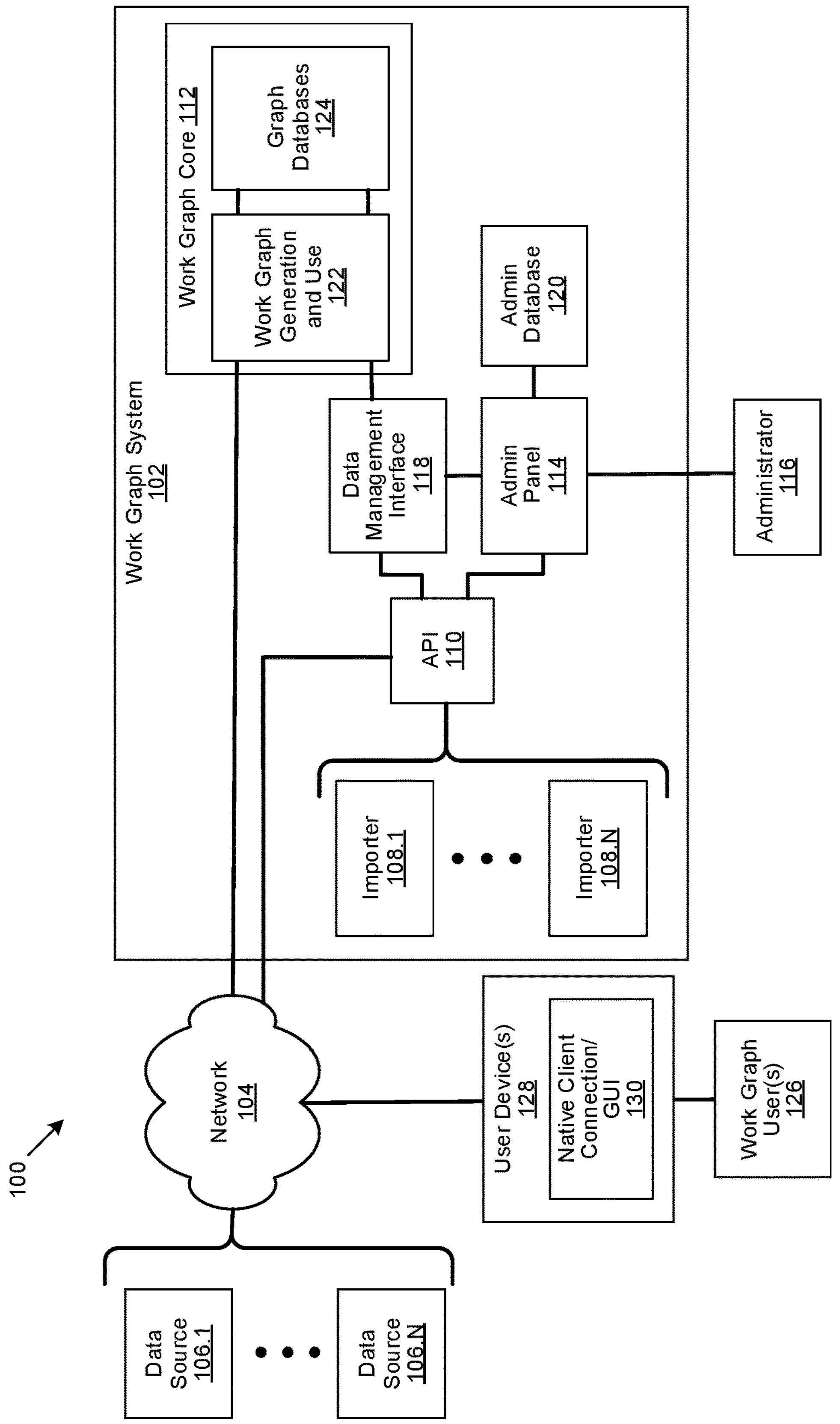
FIG. 1 depicts a general illustration of a data processing system and a work graph generation and application system.

FIG. 1 depicts an exemplary diverse data source and work graph generation and utilization system 100 that includes a work graph system 102 that generates and provides for the use of personnel work graphs. Exemplary embodiments of the work graph system 102 implement a work graph framework that utilizes importers to store data, support diverse types of data sources, are agnostic to data importation in any order, and provide enhanced capabilities for searching of people/personnel, community detection, finding influencers, etc. In certain implementations, the work graph system 102 is provided as a Service as a Solution (SaaS) solution, which can be cloud based.

Network 104 provides a communication infrastructure to allow the work graph system 102 to communicate with data sources 106. The implementation of network 104 is a matter of design choice, and network 104 is, for example, a public network, such as the Internet, a physical private network, a wireless network, a virtual private network (VPN), or any combination thereof that connects various devices to enable device data communication.

The work graph system 102 through network 104 is connected to various data sources as represented by data source 106.1 through data source 106.N (i.e., data source(s) 106). A data source provides particular data types and insights. Data sources can be diverse from one another. The work graph system 102 is implemented to combine diverse data sources into a single work graph and provide the ability to query the single work graph.

Data sources 106.1 are external data sources to work graph system 102. For example, such data sources include active directories, development platforms, services, messaging platforms, software applications, etc. The following are examples of such data sources.

An example of a data source are active directories. An active directory provides data, or has data type, as to people and their general information. Data of an active directory provides insight that allows an ability to find people by name, email, department, etc. Another example of a data source are development platforms such as GitHub®, that include data types of repositories, projects technologies for projects, contributors, etc. For example, such development platforms provide insights as to finding a developer working on a certain project or a developer proficient in a given technology. Data sources include customer relationship management (CRM) services such as SalesForce®, that include data types of opportunity information with amounts, campaigns, customer contact, etc. Such CRM services provide insights as to people who sold something to a specific customer, find percentage of deals closed for a campaign, find a total amount of a closed deal in a certain period of time, etc. Data sources can also include business and employment services such as Crossover® and LinkedIn®, that include data types of previous work experience, skills, positions, etc. Business and employment services provide contacts for certain companies, team members for a project, etc. Data sources can also include software applications and suites such as GSuite®, Office360®, emails, drives, and calendars, that include data types of documents (documents, sheets, etc.), document collaborators, emails, people that are identified in email headers (to, from, cc, bcc), calendar entries, etc. Software applications and suites provide insight to find a person who has information as to a document, find when a person has free time on their calendar to be contacted, find people who work closely together by finding out who worked on a document(s) and have shared meeting(s), find people who have subject matter expertise by finding them in email threads or meetings that are related to that subject or that contributed to a group of documents that are related to that subject. Data sources can also include messaging platforms such as Slack®, with data types of groups of people, channels, interactive teams, etc. Messaging platforms provide the ability to find participants in a certain channel, find who certain people have been in communication with, find who has been in direct contact with whom, etc. Other data sources can also include issue and tracking software applications such as Jira®, that include data types of import issues with assignees, etc. Issue and tracking software applications can provide insights as to finding people related to a certain issue or project. It is to be understood that the preceding data sources are examples, and that other data sources and data types can be accessed and used.

The work graph system 102 includes data importer components, as represented by importer 108.1 through importer 108.M (i.e., importer(s) 108). In certain implementations, importers 108 are pluggable components and are used to fetch data from a certain data source 106. In other words, importer 108.1 through importer 108.M collect data from data source 106.1 through data source 106.N, where N is an integer index greater than or equal to 2. For example, for N equals 3, the number of data sources 106 is three, 106.1, 106.2, and 106.3. In certain implementations, a particular importer 108 defines a data model configured to support a particular data source 106. Data source 106.1 through data source 106.N choose how their data is stored. Imported data can have numerous purposes. For example, Jira® data can be used to track only issues or burn chart, or map people relationships to specific issues. Therefore, an importer 108 defines a data model that best supports the data source 106 from which data is imported. The defined data model stores data as received from a data source 106 and is not constrained to be stored in a certain way, allowing the ability to support different applications and store diverse data.

In certain implementations, importer 108.1 through importer 108.M are part of a bundled suite included in work graph system 102, where M is an integer index greater than or equal to 2. A bundled suite of importers 108 can support data types from common data sources. Other implementations provide for different importers 108 to be written and provided by third parties and added to work graph system 102. This allows third parties to import data from their data sources. Third party importers 108 communicate in the same manner to work graph system 102 as a bundled suite of importers 108. In particular, all importers 108 communicate through an application program interface or API 110, further describe herein.

Extracted and gathered data from the data source 106.1 through data source 106.N are sent to the work graph system 102, and particularly to importers 108. In certain implementations, new data sources 106 and importers 108 are subsequently added and data is seamlessly added to the graphical representation of the work graphs. It is to be understood, that importers 108 provide self-sufficient data and that there is no specific order of importing data from respective data sources 106.

Certain implementations provide for synchronization of data from importers 108. Commands and/or scheduling rules from an administrator, further described herein, can include when to start synchronization as to data import from a selected importer 108. In certain implementations, such synchronization commands are based on a time schedule. A time schedule or time interval allows the ability to unify refresh data from data sources 106. If data from data sources 106 is refreshed based on triggers, importers 108 can be configured with a "listener" for such triggers of data sources 106.

The work graph system includes a work graph core 112. An importer 108 provides to the work graph core 112, an endpoint to onboard data (i.e., initial data load) and an endpoint to synchronize data (i.e., refresh data). After each endpoint, onboarding or synchronization is performed to a timestamp up to which data is collected and stored, such that for when the next synchronization is ran only new data is collected and updated. For certain implementations, importers 108 utilize sliding endpoint markers to synchronize data between data sources 106, by marking an onboard endpoint that distinguishes between a first set of data already imported to the work graph core 112 and a second set of data that is ready, but not yet transferred to the work graph core 112 and a synchronization endpoint to distinguish between the second set of data and a third set of data not ready for communication to the work graph core 112.

The work graph system 102 includes an application program interface or API 110. The API 110 provides a single point of communication that results in uniform access and efficient maintenance and development, in contrast to implementing multiple import specific APIs. The API 110 supports language agnostic communication. For example, a "representational state transfer" or REST API is used to support language agnostic communication. The API 110 is implemented as a common API used by importers 108.

The work graph system 102 further includes an administration (admin) panel 114. The administration panel 114 allows an administrator 116 to access the work graph system 102. In certain implementations, access is through a user interface/graphical user interface (not shown) of the administration panel 114. The administration panel 114 through the user interface/graphical user interface allows the administrator 116 to initiate creation of work graphs (i.e., general work graph setup), choose importers 108, and provide commands to importers 108. Through the user interface/graphical user interface of administration panel 114, administration is performed of importers 108, such as credentials for sources, how often to sync, etc. In addition, the administration panel 114 provides for work graph user administration.

The administration panel 114 triggers importers 108 to send data. In particular, the administrator provides access and/or credentials to importers 108, and triggering occurs for importers 108 to send data. Work graph system 102 includes a data management interface 118. Through the data management interface 118, the administration panel 114 receives and stores status and progress data of the importers 108. The administration panel 114 can include a timer that is used for time-based synchronization.

In certain embodiments, the administration panel 114 is configured with an administrative database 120. The administrative database 120 receives and stores from the administrative panel 114, related information that includes credential used by importers 108, statistics as to usage by importers 108, user information, etc.

The work graph core 112 includes a work graph generation and use component 122 and graph databases 124. The work graph generation and use component 122 creates and updates work graphs, and the graph databases 124 store the work graphs. Importers 108 send data from the data sources 106 to the data management interface 118. As the data management interface 118 receives the extracted data, the extracted data is queued and applied to work graphs by the work graph generation and use component 122. Queuing data can eliminate the possibility of data inconsistencies that can occur during simultaneous access, such as when two data sources 106 create the same person twice. Data changes/manipulation of work graphs are performed through API 110.

The work graph generation and use component 122 matches entities across data extracted from data sources 106 and creates a single work graph. As described earlier, entities include a person, email, documents, project, issue, etc. Entities are represented as nodes in a work graph. Interactions or attributes between entities/nodes are provided in a work graph. The work graph includes information about organization members and their work artifacts, where relationships detail interaction with the work artifacts, such as "sent emails", "collaboration in a project", etc. Entities received from data sources 106 are matched to find common entities, allowing data from different sources to be connected into a single work graph. For example, people from Slack®, SalesForce®, and active directory data sources 106 are connected to the same "Person" node in a work graph. A project from Jira® and GitHub® data sources 106 are connected to the same "Project" node in a work graph.

In certain implementations, the work graph generation and use component 122 uses a primary key or PK to match entities. For example, an email address is used as a PK for people, with an assumption that business related applications use email as an account identifier, where people use their business email addresses to sign into the business related applications. The use of a PK allows tracking of entities (e.g., people) across different data sources 106. In certain implementations, a work graph has node types. When the work graph generation and use component 122 receives data from importers 108, a validation can be performed to determine that node types of a work graph have a correct PK structure. If a node type does not exist, the node type is created to avoid duplicating content and provide the ability to connect data into a single work graph. Entities are matched by node type and PK. The work graph generation and use component 122 implements a "select or insert" approach, where certain nodes are connected.

The work graph generation and use component 122 sends and accesses work graphs to graph databases 124, where the work graphs are stored. For certain embodiments, a graph database, such as Neo4j® database is used for graph databases 124. A graph database is implemented to allow for flexibility to store diverse data. As described above, data sources 106 and importers 108 can define particular data models. Data graphs support dynamically adding new data types and relationships.

In certain implementations, when a database, such as Neo4j® database, does not support multiple databases for a single instance, one instance per organization is provided. In such implementations, for each database instance, a container is provided for each database instance. Database instances are separated from one another, such that their loads do not influence one another. This implementation allows for efficient resource allocation per database. In certain implementations, each graph database of graph databases 124 contains information for one organization, providing security and efficient querying of work graphs. Separate graph databases of graph databases 124 allow for data to be physically separated between organizations. In certain instances, organization have multiple companies, and those multiple companies are loaded into a single work graph for the organization.

In certain implementations, each graph database of graph databases 124 has a dedicated data manager that manages different subsystems. Different subsystems are provided to allow for more efficient scaling, monitoring, and maintenance. The implementation of different subsystems assure that data synchronization of work graphs do not affect one another. Different queues can be implemented to prevent work graphs from blocking messages related to other work graphs.

A user is defined as a person or software system that accesses work graph system 102. Work graph user(s) 126 represents such users. In certain implementations, work graph user(s) 126 access the work graph system 102 through user device(s) 128 which are connected to the network 104. In certain implementations, the user device(s) 128 includes a native client connection/graphical user interface (GUI) 130 to access the work graph core 112. In particular, work graph user(s) 126 access the work graph generation and use component 122 to get insights as to work graphs stored in graph databases 124. Queries for insights are made as to data in the work graphs of graph databases 124. Since the work graph system 102 gathers data from many data sources 106 into a single and flexible database (of graph databases 124) that can be queried, work graph user(s) 126 focus on querying for insights. Examples of querying are further described herein.

A query is performed on data stored in graph databases (i.e., work graphs) of graph databases 124. In certain implementations, the user device(s) 128 use a query language, such as Cypher® to perform the querying on the graph databases 124.

Figure 2:
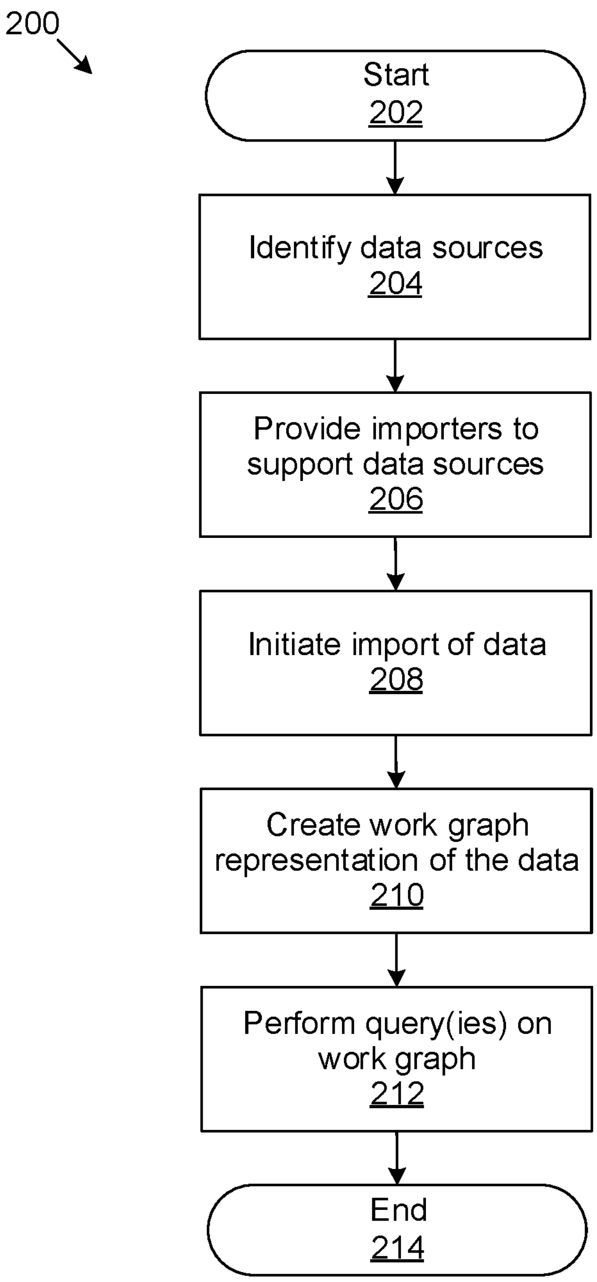
FIG. 2 depicts a general flowchart for generating and applying a personnel work graph.

FIG. 2 depicts a personnel work graph generation and utilization process 200, which in at least one embodiment is performed by one or more embodiments of the work graph system 100. Reference is made to FIG. 1 as to certain elements. In at least one embodiment, the work graph generation and utilization system 100 and in particular the work graph system 102 operates in accordance with the personnel work graph generation and utilization process 200.

At step 202, the process 200 starts. Various data sources 106.1-106.N (collectively, data sources 106) store data with various data types and insights as entities. At step 204 data sources are identified. Data sources 106 are generally external to the work graph system 100. Examples of such data sources are discussed above in reference to FIG. 1.

At step 206, importers of data from data sources are provided. Importers 108 collect data from the data sources 106, where, in at least one embodiment, a specific importer 108 supports a specific data source 106. A data source 106 and its importer 108 define a data model. In specific, a particular data source 106 defines a data model the determines how data is stored from the particular data source 106. As discussed above, importers 108 can be pluggable components that are part of a bundle suite of importers 108 included in work graph system 102. In certain implementations, third parties provide importer(s) 108 to be included work graph system 102. A common API, such as API 110 is implemented by importers 108.

At step 208, importing of data is initiated. In certain implementations, an administrator 116 through an administration panel 114 triggers importers 108 to send data to work graph core 110, and particularly to work graph generation and use component 122. Access and/or credentials are provided to importers used to send data to the work graph core 112. In certain implementations, the administration (admin) panel 114 provides commands to importers 108 associated with onboarding and synchronization of data received by work graph core 112. Endpoints can be provided by importers 108 as to onboard or initial load of data and synchronization or refresh of data.

At step 210, a work graph is created from the imported data. In certain implementations, the work graph generation and use component 122 matches entities from data sources 106 and creates a single work graph. The work graph includes nodes representing entities. Interactions or attributes between entities/nodes are provided in the work graph. Certain implementations provide for a primary key or PK to match entities. A work graph provides for node types. The work graph generation and use component 122 implements a "select or insert" approach, where certain nodes are connected. Created work graphs can be stored in graph databases 124.

At step 212, queries are performed on work graph(s). Through user device(s) 128, work graph user(s) 126 access the work graph system 102. Queries are sent to the work graph core 112 that includes the work graph generation and use component 122 and the graph databases 124, to get insights as to work graphs stored in graph databases 124. User device(s) 128 can use a query language, such as Cypher® to perform the queries. At step 214, the process ends.

Figure 3:
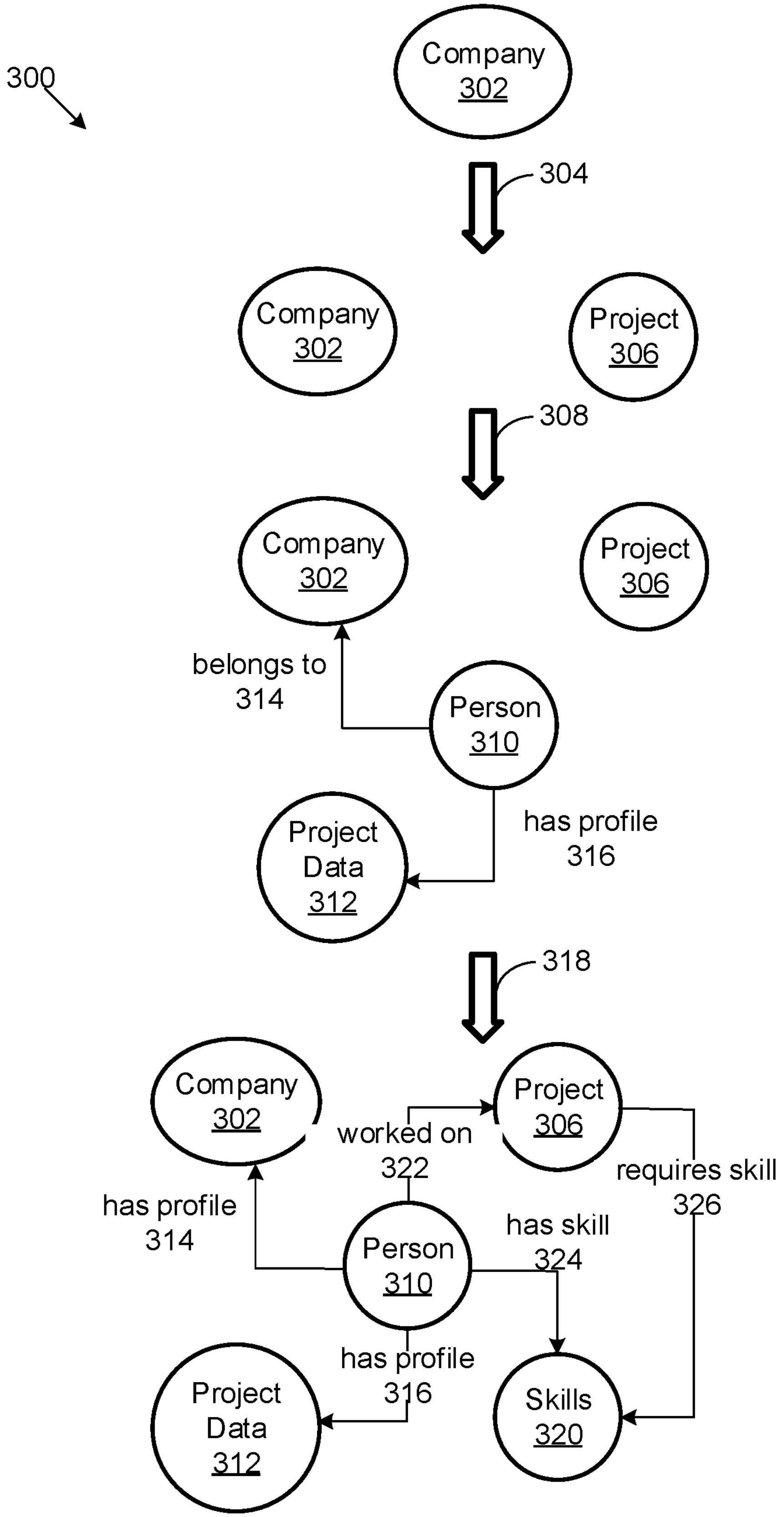
FIG. 3 depicts a process flow for generating a personnel work graph.

FIG. 3 shows a process flow for generating a personnel work graph by one or more embodiments of the work graph system 102. Process flow 300 is a specific implementation of generating a personnel work graph. The process flow 300 is an example of receiving data from various sources and organizing such data into a single work graph used to identify or provide profiles of personnel and related work artifacts based on queries by users of the work graph.

As an example, Active Directory source includes people and their general information. A work graph is created based using data from the Active Directory, and work graph nodes and relations are added. In another GitHub® source, there is data as to repositories and projects, technologies used for a project, contributors (i.e., people) etc.

An integration for an organization with the Active Directory and GitHub® sources occurs to create a work graph. If a company node 302 does not exist in the work graph, company node 302 is created. For example, the company node 302 has a attributes as to "id", "name", etc.

Then following at operation 304, a list of all "git" repositories in the organization is retrieved from the GitHub® source. A GitHub® API is used in getting (receiving) the list of "git" repositories. A project node 306 for the work graph is created for each repository. The project node 306 attributes include "name", "description", "last update time", "project ID", "last fetch time", etc.

Following at operation 308, commits on branches/edges are fetched. A determination is made as to lines of code, number of commits, and code language (i.e., skill) for each contributor/person, using previous fetched commits. A person node 310 is created for each contributor, if the person node 310 does not already exist. Project data (e.g., GitHub®) node 312 is created for each contributor, if not already existing. The person node 310 attributes include "job title", "primary email", "university", "phone", "department", "location", "time zone", "image url", "Skype ID", "GitHubPersonName", etc. The project data (e.g., GitHub®) node 312 attributes include "first name", "last name", "last updated time", "primary email", etc. A relation "belongs to" 314 is created from person node 310 to the company node 302. A relation "has profile" 316 is created from person node 310 to the project data (e.g., GitHub®) node 312.

Following at 318, a skills node 320 is created, if skills node 320 does not already exist. The skills node 320 is created using the data described at 308, in particular, determination is made as to lines of code, number of commits, and code language (i.e., skill) for each contributor/person, using previous fetched commits. The skills node 320 attributes include "name", etc.

A relation "worked on" 322 is created from person node 310 to the project node 306. A relation "has skills" 324 is created from person node 310 to the skills node 320, where the person node 310 describes a contributor. A relation "requires skill" 326 is created from project node 306 to the skills node 320, where the project node 306 is a repository fetched from project data (e.g., GitHub®) node 312.

Examples of attributes of the relation "worked on" 322 include "start time", "end time", etc. Examples of attributes of the relation "has skills" 324 include "days of experience", "number of projects", "lines of code", "number of commits", "number of deals closed", "number of conferences attended", "number of events organized", etc. Examples of attributes of the relation "requires skills" 326 include "personal email", "lines of code added", "lines of code deleted", "number of commits", "number of deals closed", "number of conferences attended", "number of events organized", etc.

The following examples are use cases or queries that can be made as to a work graph. To obtain an introduction to a certain person, such as a person who has a higher role in an organization, it is desirable to find a person to make the introduction. Using a work graph, a connection is found between two people by looking at a path created by communication edges (e.g., as defined by email, Slack®, meeting, etc.) or two people that worked together on a project.

To find a person with two years of a particular programming language, such as Scala®, a query is made to find a person who contributed to a project with Scala® source code, such as implemented by GitHub® or has Scala® coding experience as a skill (e.g., as defined by GitHub®, XO, LinkedIn®, etc.), and those projects cover two years (e.g., as defined by GitHub®, XO, LinkedIn®, etc.).

To find a person that has a similar skill set as a given person, a query is made to find a person that has more than five years of work experience (e.g., as defined by LinkedIn®, XO, etc.), has experience in a given language (e.g., as defined by LinkedIn®, XO, GitHub®, etc.), contributed more than one million lines of code in that language (e.g., as defined by GitHub®) and managed a team of size at least five (e.g., as defined by XO, etc.).

To find a person that is able to create a good JavaScript® tutorial document, a query is made to find people that have the skill of JavaScript® (e.g., as defined by LinkedIn®, GitHub®, etc.), has development experience of more than five years (e.g., as defined by XO, LinkedIn®, GitHub®, etc.), has written more than 100 k lines of code in JavaScript® (e.g., as defined by GitHub®), and contributed to more than 50 documents (e.g., as defined by Office®, etc.).

To find a person to help close a deal with an company, such as Apple®, a query is made to find a person that either has worked at Apple® (e.g., as defined by background info, etc.) or has closed a deal with them (e.g., as defined by SalesForce®, etc.) or has experience in closing large deals, such as over $100K US (e.g., as defined by SalesForce®, etc.) or has a constant communication with someone at Apple® (e.g. as defined by Slack®, email, etc.).

To find a salesperson to create a cost analysis between a Microsoft® and Oracle® database solution, a query is made to find a person in sales (e.g., as defined by XO, LinkedIn®, sales force, etc.), that worked at Microsoft® and/or Oracle® (e.g., as defined by background info, etc.) and is currently in contact with someone from Microsoft® and/or Oracle® (e.g., as defined by Slack®, email, etc.).

To find a person who is able to help with an issue in a work graph, a query is made to find persons that closed the number of issues on project (e.g., as defined by Jira®, etc.), contributed a certain amount of code (e.g., as defined by GitHub®, etc.) and has messages and emails that contain a work graph string. Results are sorted by the number of issues or contribution size.

To find a person from sales that are communicating with the same client, a query is made to find all salespersons (e.g., as defined by SalesForce® accounts, etc.) that have a communication connection (e.g., as defined by slack®, email, meeting, etc.) to a same external person or client.

To identify needed team members, count all issues by technologies needed for their resolution by connecting Jira® to extract open issues and get data about technologies used inside a project from GitHub®. If it is determined that 500 open issues related to JavaScript®, consideration should be considered by adding a JavaScript® developer.

To identify team productivity, get teams from XO and connect the teams to GitHub® to determine how many lines of code have been added to a certain project by a given team, for example team A has four members that contributed 5000 lines over a particular period to their projects, while team B has only two members that contributed 4000 lines of code over the same particular period.

Figure 4:
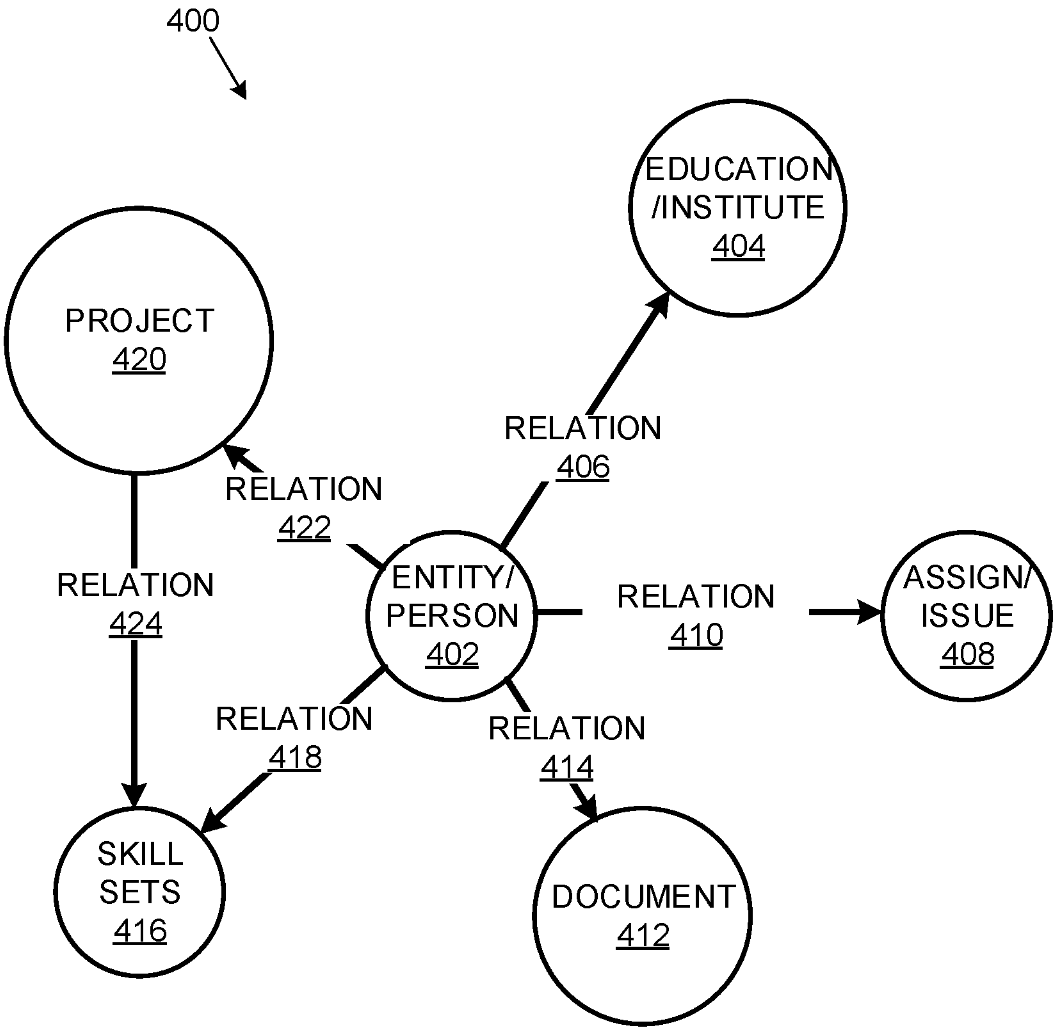
FIG. 4 depicts a personnel work graph.

FIG. 4 shows an example of a personnel work graph. The work graph 400 includes a node 402 that represents an entity/person. Entity/person node 402 is connected to other nodes which represent particular entities or objects. The edges connecting the nodes are represented by directional arrows. The edges represent particular relationships which are specifically described below. The directional arrows have an origin node and destination node describing relation of the origin node to the destination node.

In this example, entity/person node 402 is an origin node to education/institute node 404. The edge or arrow shows a relation 406, which for example is that the entity/person "studied at" the university defined by education/institute node 404. Entity/person node 402 is an origin node to assign/issue node 408. The edge or arrow shows a relation 410, which for example is that the entity/person 402 "assigned to address an issue" defined by assign/issue node 408. Entity/person node 402 is an origin node to document node 412. The edge or arrow shows a relation 414, which for example is that the entity/person 402 "has been a collaborator to a document" defined by document node 412. Entity/person node 402 is an origin node to skill sets node 416. The edge or arrow shows a relation 418, which for example is that the entity/person 402 "has a skill" defined by skill sets node 416. Entity/person node 402 is an origin node to project node 420. The edge or arrow shows a relation 422, which for example is that the entity/person 402 "worked on a project" defined by project node 420.

In this example, the project node 420 is an origin node to skill sets node 416. The edge or arrow connecting project node 420 to skill sets node 416 shows a relation 424, which for example is that the project node 420 "requires a skill set, such as a programming language" as defined by skill sets node 416.

For purposes of this disclosure, a data processing system includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a data processing system is a personal computer, a network storage device, or any other suitable device and varies in size, shape, performance, functionality, and price. The data processing system includes random access memory (RAM), one or more processing resources such as a central processing unit (CPU) or hardware or software control logic, ROM, and/or other types of nonvolatile memory. Additional components of the data processing system includes one or more disk drives, one or more network ports for communicating with external devices as well as various input and output (I/O) devices, such as a microphone, keyboard, a video display, a mouse, etc. The data processing system also includes one or more buses operable to transmit communications between the various hardware components.

Figure 5:
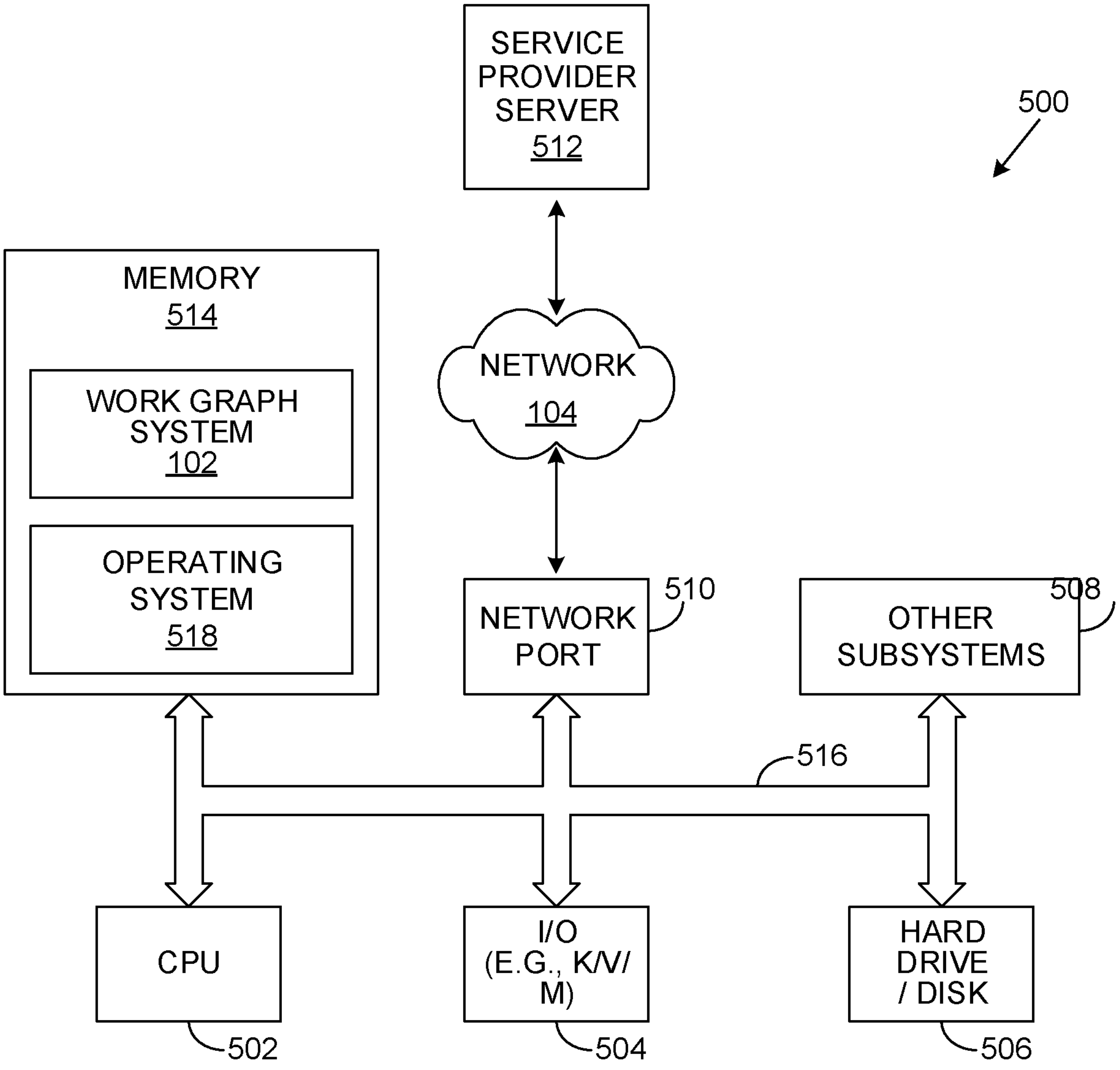
FIG. 5 depicts a general illustration of data processing system.

FIG. 5 is a generalized illustration of data processing system 500 that represents one embodiment of an environment that implements the work graph system 102 used to implement the system and method of the described. The data processing system 500 includes a processor (e.g., central processor unit or "CPU") 502, input/output (I/O) devices 504, such as a microphone, a keyboard, a video/display, a mouse, and associated controllers (e.g., K/V/M), a hard drive or disk storage 506, and various other subsystems 508. In various embodiments, the data processing system 102 also includes network port 510 operable to connect to the network 106, which is likewise accessible by a service provider server 512. The data processing system 102 likewise includes system memory 514, which is interconnected to the foregoing via one or more buses 516. System memory 514 further includes operating system (OS) 518 and in various embodiments includes the work graph generation and application system 104.

In certain implementations, operations, resources, and services of the work graph generation and application system 104 is provided as a service. In certain implementations, the service can be provided as "software as a service" or SaaS and/or a cloud based service, from service provider server 512, As discussed below, embodiments of the work graph generation and application system 104 allow different data sources to be imported and create work graphs for particular entities or persons. Such work graphs are graphical representations or graphs, that describe specific entities or persons, their attributes, interrelationships with other entities, projects, organizations, groups, skill sets, etc. In particular, the different data sources provide for personnel and work artifact profiles, where work artifacts include documents, repositories, email, etc. related to particular persons. As discussed further below, diverse sources of data are used to create work graphs, combining those sources in a single work graph and providing an ability to query the work graph. A work graph has an unlimited number of node types and descriptive relationships between the nodes, providing flexibility as to graph or representational structure.

A work graph includes data that shows diverse relationships between entities inside an organization, where entities represented as nodes, include a person, email, documents, project, issue, etc. In other words, a work graph describes more than an organizational hierarchy, and includes other relationships. For example, a work graph relates interpersonal communication (e.g., email that is communicated between personnel that are not in the same organizational chart, are at very different organizational levels, etc.), documents shared/authored by personnel in different organizational groups, projects that involve different personnel from different organizational group (e.g., a project that involves engineering, finance, marketing, etc.), issues that affect or are influenced by different personnel, etc.

Interactions or attributes between entities/nodes are provided in a work graph. Examples of such interactions or attributes include which person sent email to whom, who collaborated to create a specific document, etc. As discussed, a work graph is a framework implemented by work graph generation and application system 104. The work graph is a flexible data structure that supports diverse types of data sources.

As will be appreciated by one skilled in the art, the described is embodied as a method, system, or computer program product. Accordingly, embodiments are implemented entirely in hardware, entirely in software (including firmware, resident software, micro-code, etc.) or in an embodiment combining software and hardware. These various embodiments are generally referred to herein as a "circuit," "module," or "system." Furthermore, the described take the form of a computer program product on a computer-usable storage medium having computer-usable program code embodied in the medium.

Any suitable computer usable or computer readable medium is utilized. The computer-usable or computer-readable medium is, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium is any medium that contain, store, communicate, or transport the program for use by or in connection with the instruction execution system, apparatus, or device.

Computer program code for carrying out operations of the described is written in an object-oriented programming language such as Java, Python, Smalltalk, C++ or the like. However, the computer program code for carrying out operations of the described are also written in conventional procedural programming languages, such as the "C" programming language or similar programming languages. The program code executes entirely on the user's computer, partly on the user's computer, as a stand-alone software package, partly on the user's computer and partly on a remote computer or entirely on the remote computer or server. In the latter scenario, the remote computer is connected to the user's computer through a local area network (LAN) or a wide area network (WAN), or the connection is made to an external computer (for example, through the Internet using an Internet Service Provider).

Embodiments of the described are described with reference to flowchart illustrations and/or block diagrams of methods, apparatus (systems) and computer program products according to embodiments of the described. It will be understood that each block of the flowchart illustrations and/or block diagrams, and combinations of blocks in the flowchart illustrations and/or block diagrams, is implemented by computer program instructions. These computer program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions are stored in a computer-readable memory that direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions are loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The described is well adapted to attain the advantages mentioned as well as others inherent therein. While the described has been depicted, described, and is defined by reference to particular embodiments of the described, such references do not imply a limitation on the described, and no such limitation is to be inferred. The described is capable of considerable modification, alteration, and equivalents in form and function, as will occur to those ordinarily skilled in the pertinent arts. The depicted and described embodiments are examples only and are not exhaustive of the scope of the described.

Consequently, the described is intended to be limited only by the spirit and scope of the appended claims, giving full cognizance to equivalents in all respects.

What is claimed is:

1. A computer-implemented method for generating and using work graphs for multiple organizations, the method comprising: a work graph system having a data management interface, one or more processors, and a memory storing code, wherein the data management system is associated with a queue and execution of the code by the one or more processors causes the work graph system to perform operations comprising:

providing one or more importers, wherein a particular importer supports a particular data source; importing through the importers, data from one or more data sources that provide particular data types and insights to entities of the organizations, wherein the data is related to one or more entities of each of the organizations; matching entities from the one or data sources to create the work graphs, wherein each of the organizations is associated with distinct one or more of the work graphs, wherein (i) each work graph is stored in a separate graph database, (ii) each work graph has a dedicated data manager that manages each separate graph database, and (iii) the work graphs include node types and matching the entities comprises: associating respective primary keys with each of the entities, which allows tracking of entities across multiple different data sources; validating the node types to determine that the node types of awork graph have a correct primary key structure; and using the node type and primary key to match the entities, the data management interface uses the queue to prevent inconsistencies as data is simultaneously accessed by at least two data sources; providing a container for the work graphs in separate database instances; sending the work graphs to respective ones of the separate database instances; and performing a query to one of the database instances as to a particular insight of an entity stored in the work graph.

2. The computer-implemented method of claim 1, wherein the one or more data sources include one or more of the following: active directories, development platforms, services, messaging platforms, and software applications.

3. The computer-implemented method of claim 1, wherein a data source defines a particular data model and a data source that supports the data source imports and stores data using the particular data model.

4. The computer-implemented method of claim 1, wherein the one or more importers are pluggable components, and part of a bundle suite or provided by a third party.

5. The computer-implemented method of claim 1, wherein the one or more importers use a common application program interface to import the data.

6. The computer-implemented method of claim 1, wherein the one or more importers provide endpoints for onboarding and synchronization of data.

7. The computer-implemented method of claim 1 wherein the databases are graph databases.

8. A system comprising: a work graph system having a data management interface, one or more processors, and a memory storing code, wherein the data management system is associated with a queue and execution of the code by the one or more processors causes the work graph system to perform operations comprising:

provide one or more importers, wherein a particular importer supports a particular data source; import through the importers, data from one or more data sources that provide particular data types and insights to entities of the organizations, wherein the data is related to one or more entities of each of the organizations; matching entities from the one or data sources to create the work graphs, wherein each of the organizations is associated with distinct one or more of the work graphs, wherein (i) each work graph is stored in a separate graph database, (ii) each work graph has a dedicated data manager that manages each separate graph database, and (iii) the work graphs include node types and matching the entities comprises: associating respective primary keys with each of the entities, which allows tracking of entities across multiple different data sources; validating the node types to determine that the node types of awork graph have a correct primary key structure; and using the node type and primary key to match the entities, the data management interface uses the queue to prevent inconsistencies as data is simultaneously accessed by at least two data sources;

providing a container for the work graphs in separate database instances; sending the work graphs to respective ones of the separate database instances; and performing a query to one of the database instances as to a particular insight of an entity stored in the work graph.

9. The system of claim 8, wherein the one or more data sources include one or more of the following: active directories, development platforms, services, messaging platforms, and software applications.

10. The system of claim 8, wherein a data source defines a particular data model and a data source that supports the data source imports and stores data using the particular data model.

11. The system of claim 8, wherein the one or more importers are pluggable components, and part of a bundle suite or provided by a third party.

12. The system of claim 8, wherein the one or more importers use a common application program interface to import the data.

13. The system of claim 8, wherein the one or more importers provide endpoints for onboarding and synchronization of data.

14. The system of claim 8 further comprising storing the work graph in a graph database.

15. A non-transitory, computer-readable storage medium embodying computer program code for generating and using work graphs for multiple organizations, the computer program code comprising computer executable instructions configured for: providing a data management system associated with a queue; providing one or more importers, wherein a particular importer supports a particular data source; importing through the importers, data from one or more data sources that provide particular data types and insights to entities of the organizations; matching entities from the one or data sources to create the work graph; identifying one or more data sources that provide particular data types and insights to entities of the organizations; providing one or more importers, wherein a particular importer supports a particular data source; importing through the importers, data from the one or more data sources, wherein the data is related to one or more entities of each of the organizations; matching entities from the one or data sources to create the work graphs, wherein each of the organizations is associated with distinct one or more of the work graphs, wherein (i) each work graph is stored in a separate graph database, (ii) each work graph has a dedicated data manager that manages each separate graph database, and (iii) the work graphs include node types and matching the entities comprises: associating respective primary keys with each of the entities, which allows tracking of entities across multiple different data sources; validating the node types to determine that the node types of a work graph have a correct primary key structure; and using the node type and primary key to match the entities; providing a container for the work graphs in separate database instances, the data management interface uses the queue to prevent inconsistencies as data is simultaneously accessed by at least two data sources; sending the work graphs to respective ones of the separate database instances; and performing a query to one of the database instances as to a particular insight of an entity stored in the work graph.

16. The non-transitory, computer-readable storage medium of claim 15, wherein a data source defines a particular data model and a data source that supports the data source imports and stores data using the particular data model.

17. The non-transitory, computer-readable storage medium of claim 15, wherein the one or more importers are pluggable components, and part of a bundle suite or provided by a third party.

18. The non-transitory, computer-readable storage medium of claim 15, wherein the one or more importers use a common application program interface to import the data.

19. The non-transitory, computer-readable storage medium of claim 15, wherein the one or more importers provide endpoints for onboarding and synchronization of data.

20. The non-transitory, computer-readable storage medium of claim 15 further comprising storing the work graph in a graph database.

21. The computer-implemented method of claim 1:

wherein each work graph includes nodes, each entity is represented by one of the nodes, each of the nodes has a node type associated with the entity, and each node type has a primary key structure;

wherein executing the instructions causes the data processing system to further perform:

when the data related to one or more of the entities is imported from the one or more data sources, validating the primary key structure for each node type associated with the one or more entities; and when a node type does not exist, creating the node type to avoid duplicating content and provide an ability to connect data into a single work graph.

22. The system of claim 8:

wherein each work graph includes nodes, each entity is represented by one of the nodes, each of the nodes has a node type associated with the entity, and each node type has a primary key structure;

during operation the processor executes the instructions to further:

when the data related to one or more of the entities is imported from the one or more data sources, validate the primary key structure for each node type associated with the one or more entities; and when a node type does not exist, create the node type to avoid duplicating content and provide an ability to connect data into a single work graph.

23. The non-transitory, computer-readable storage medium of claim 15:

wherein each work graph includes nodes, each entity is represented by one of the nodes, each of the nodes has a node type associated with the entity, and each node type has a primary key structure;

the computer program code further comprises computer executable instructions configured for:

when the data related to one or more of the entities is imported from the one or more data sources, validating the primary key structure for each node type associated with the one or more entities; and when a node type does not exist, creating the node type to avoid duplicating content and provide an ability to connect data into a single work graph.

* * * * *